(12) United States Patent
Wood (10) Patent No.: US 8,454,246 B2
(45) Date of Patent: Jun. 4, 2013

(54) HANDHELD CAMERA BALANCING SUPPORT SYSTEM

(76) Inventor: Dennis Wood, Thunder Bay (CA)

( * ) Notice: Subject to any disclaimer, the term of this patent is extended or adjusted under 35 U.S.C. 154(b) by 0 days.

(21) Appl. No.: 13/085,138

(22) Filed: Apr. 12, 2011

(65) Prior Publication Data

US 2011/0249964 A1   Oct. 13, 2011

(30) Foreign Application Priority Data

Apr. 12, 2010 (CA) .................................. 2699691

(51) Int. Cl.
*G03B 17/00* (2006.01)

(52) U.S. Cl.
USPC ........................................ 396/428; 248/182.1

(58) Field of Classification Search
USPC .............................. 248/180.1, 182.1; 396/428
See application file for complete search history.

(56) References Cited

U.S. PATENT DOCUMENTS

| | | |
|---|---|---|
| 5,098,182 A | 3/1992 | Brown |
| 5,229,798 A | 7/1993 | Brown |
| 5,742,859 A | 4/1998 | Acker |
| 6,554,500 B2 | 4/2003 | Melitopoulos |
| 7,255,499 B2 | 8/2007 | Schaller |
| 7,563,038 B2 | 7/2009 | Hershenzon |
| 2003/0012571 A1* | 1/2003 | Nakatani ................ 396/428 |
| 2008/0308688 A1* | 12/2008 | Dillard ................. 248/123.11 |
| 2009/0196597 A1* | 8/2009 | Messinger et al. ......... 396/427 |
| 2009/0257741 A1 | 10/2009 | Greb et al. |
| 2010/0172642 A1* | 7/2010 | Orf et al. ................. 396/421 |
| 2010/0238345 A1* | 9/2010 | Greb et al. ............... 348/373 |
| 2011/0019992 A1* | 1/2011 | Orf ........................ 396/419 |
| 2011/0188847 A1* | 8/2011 | McKay .................... 396/421 |

FOREIGN PATENT DOCUMENTS

| | | |
|---|---|---|
| WO | 2010078571 A1 | 7/2010 |
| WO | 2010078575 A1 | 7/2010 |

* cited by examiner

*Primary Examiner* — Rodney Fuller
*Assistant Examiner* — Fang-Chi Chang
(74) *Attorney, Agent, or Firm* — Ryan W. Dupuis; Kyle R. Satterthwaite; Ade & Company Inc (57) ABSTRACT

A balancing support system is provided for a handheld electronic device enabled with a camera. The support system is balanced on a central apex of a handle member. Laterally spaced apart clamping members allow various camera devices to be clamped onto the support system. Counterbalancing stabilizer arms are also able to support a camera on the support system in a self-supported and upright orientation. A steering member transmits steering movement to the camera device relative to the handle member through a magnetic interaction to minimize the effects of undesirable user movements on the video being captured by the camera device.

20 Claims, 10 Drawing Sheets

HANDHELD CAMERA BALANCING SUPPORT SYSTEM

This application claims foreign priority benefits from Canadian Patent Application 2,699,691 filed Apr. 12, 2010.

FIELD OF THE INVENTION

The present invention relates to a balancing support system arranged to support a handheld camera enabled device thereon such that the camera enabled device is balanced on a balance point of the support system so as to steady motion of a camera operator displacing the camera enabled device through an environment being captured on video by the camera enabled device.

BACKGROUND

In recent years the quality of cameras on small hand-held electronic devices has improved considerably such that it is now common to capture quality video on point and shoot cameras, smart phones, and the like in addition to camcorders and other dedicated video capturing devices. When capturing video on a camera while moving through a scene, it is desirable to support the camera on a device which steadies the motion of the camera, typically by counterbalancing the camera on a substantially free pivot. Known designs however are typically only well suited for larger cameras having a considerable mass relative to small hand-held electronic devices which are now enabled with cameras.

U.S. Pat. No. 7,563,038 by Hershenzon discloses a support for a camcorder in which the camcorder is counterbalanced with a stabilizer arm on a free pivot which comprises a ball received within a socket. The large contact area between the ball and surrounding socket results in sufficient friction that minor movements of the operator grasping a handle of the ball can be readily transmitted through the socket to the camera.

U.S. Pat. Nos. 7,255,499 by Schaller and 5,742,859 by Acker disclose further examples of camera balance devices relying on a universal joint comprised of bearings and multiple pivoting parts to allow substantially free pivotal movement of the camera and stabilizer weight relative to the operator supported handle. The complexity of the pivot joints in each instance also results in a sufficient contact area of relative moving parts that the small amount of friction can transmit small vibrating movements from the user to the camera through the pivotal connection when using small hand-held electronic devices. The problem of small user movements being transmitted through the pivot is typically not of concern when using a larger camera as the mass of the camera in the prior art functions to dampen the movement transmitted through the joint.

Furthermore, in each instance in the prior art, steering of the camera typically requires contacting a portion of the support device which is in fixed connection to the camera such that small user vibrations in steering the direction of the camera can be readily transmitted to the video being captured. When using larger cameras in the prior art, the mass of the camera also typically dampens the vibration of a steering movement by the operator; however, the prior art devices are unsuitable for the light weight hand-held electronic devices now enabled with cameras.

The prior art devices are also limited in that the mounting configuration of the camera can only accept conventional camera mounts so that there is no device suitable to support a variety of hand-held electronic devices such as smart phones which are now enabled with cameras.

SUMMARY OF THE INVENTION

According to one aspect of the invention there is provided a balancing support system for a handheld camera device comprising:

a camera mount arranged to support the handheld camera device in fixed relation thereon;

a support body including a first pivot coupling comprising a socket formed in a bottom side of the support body, the support body supporting the camera mount on a top side thereof opposite the bottom side such that the camera mount is arranged to support the handheld camera device above the first pivot coupling;

the socket of the first pivot coupling including an inner surface which tapers upwardly and inwardly to a central apex of the socket;

a handle member comprising a grip portion arranged to be gripped in a hand of a user, a tip portion defining a second pivot coupling tapering inwardly towards a central apex at a free end of the handle member opposite the grip portion, and an arm portion extending in fixed relation between the grip portion and the tip portion; and at least one stabilizer arm extending between a first end coupled to the support body and a second end supporting a stabilizing weight thereon below the socket on the support body;

the first and second pivot couplings being arranged to be coupled for pivotal movement relative to one another about a balance point between the first and second pivot couplings;

the tip portion being arranged to be received in the socket such that the central apex of the tip portion is aligned with the central apex of the socket at the balance point and such that the stabilizing weight of said at least one stabilizer arm supported below the balance point is balanced about the balance point on the central apex of the tip portion with the handheld camera device arranged to be supported by the camera mount above the balance point.

Use of a pivot coupling in the present invention which comprises a single pointed apex on the handle which is received within a socket also having a central apex limits the contact area between the operator supported handle and the support body upon which the camera is mounted to a single point. This effectively prevents transmission of small side to side vibration movements of the user even when small light weight hand-held electronic devices are supported on the camera mount.

Preferably the tip portion of the handle member is freely separable from the socket of the support body.

Preferably the socket diverges from the central apex thereof greater than the tip portion such that the support body is angularly adjustable relative to the handle member from a vertical pivot axis between the support body and the handle member while the central apex of the tip portion remains engaged with the central apex of the socket. The apex of the socket is preferably greater than 90 degrees so as to span approximately 135 degrees for example. The apex of the tip portion is preferably less than 90 degrees so as to span approximately 45 degrees for example.

A length of the arm portion of the handle member is preferably greater than a length of said at least one stabilizer arm between the first and second ends thereof.

The camera mount is preferably supported on the support body such that the camera mount is angularly adjustable relative to the support body about a first axis and the first end of said at least one stabilizer arm is supported on the support body such that said at least one stabilizer arm is angularly adjustable relative to the support body about a second axis.

There may be provided a pair of stabilizer arms pivotally coupled onto opposing sides of the support body adjacent a bottom end of the support body so as to be arranged for pivotally movement about a generally common horizontal axis.

Preferably the camera mount is supported on the support body such that the camera mount is angularly adjustable relative to the support body about a horizontal axis.

In one embodiment, the camera mount comprises a threaded fastener arranged to mate with a threaded socket in the handheld camera device.

Alternatively, the camera mount may comprise a pair of laterally spaced apart clamping members arranged to clamp against opposing sides of a body of the handheld camera device supported therebetween. In this instance, preferably each clamping member includes a resilient member arranged to engage the respective side of the body of the handheld camera device. The clamping members of the camera mount may be pivotal relative to the support body about a common horizontal axis spanning in a lateral direction between the clamping members.

When used in combination with a handheld camera device which is elongate in a longitudinal direction and which includes a camera arranged to capture video images in which the camera is oriented perpendicularly to the longitudinal direction, the clamping members may support the handheld camera device therebetween such that the longitudinal direction of the handheld camera device spans horizontally between the clamping members. In this instance a handheld camera device such as a smart phone may be clamped between the clamping members.

Preferably the stabilizer arm (or arms) is arranged to support the support body such that the support body is self-supported in an upright orientation by said at least one stabilizer arm when said at least one stabilizer arm is engaged upon a horizontal supporting surface.

When there is provided a pair of stabilizer arms supporting respective stabilizer weights thereon, the pair of stabilizer weights are preferably spaced apart from one another in a lateral direction on opposing sides of the support body. The pair of stabilizer weights may be elongate in a longitudinal direction oriented horizontally and perpendicularly to the lateral direction.

The stabilizer arms may be angularly adjustable relative to the support body about a longitudinal axis oriented substantially parallel to the longitudinal direction of the stabilizer weights.

The system may be used in combination with a steering member which is separate from the support body. Preferably the steering member includes a grip portion arranged to be gripped in a hand of user. When a first magnetic coupling member is supported on the support body and a second coupling member is supported on the steering member, and the first and second magnetic coupling members are arranged to interact magnetically with one another, a steering movement of the steering member relative to the handle member is preferably arranged to controllably induce a steering movement of the support body relative to the handle member.

According to a second aspect of the present invention there is provided a balancing support system for a handheld camera device comprising:

a camera mount arranged to support the handheld camera device in fixed relation thereon;

a support body including a first pivot coupling and supporting the camera mount on a top side thereof such that the camera mount is arranged to support the handheld camera device above the first pivot coupling;

a handle member comprising a grip portion arranged to be gripped in a hand of a user and a second pivot coupling fixed relative to the grip portion; and at least one stabilizer arm extending between a first end coupled to the support body and a second end supporting a stabilizing weight thereon below the first pivot coupling on the support body;

the first and second pivot couplings being arranged to be coupled for pivotal movement relative to one another about a balance point between the first and second pivot couplings such that the stabilizing weight of said at least one stabilizer arm supported below the balance point is balanced about the balance point with the handheld camera device arranged to be supported by the camera mount above the balance point; and the camera mount comprising a pair of laterally spaced apart clamping members arranged to clamp against opposing sides of a body of the handheld camera device supported therebetween.

By providing clamping members on the camera mount, a variety of camera enabled devices can be readily supported on the balancing support system other than cameras having conventional camera mounts.

According to a third aspect of the present invention there is provided a balancing support system for a handheld camera device comprising:

a camera mount arranged to support the handheld camera device in fixed relation thereon;

a support body including a first pivot coupling and supporting the camera mount on a top side thereof such that the camera mount is arranged to support the handheld camera device above the first pivot coupling;

a handle member comprising a grip portion arranged to be gripped in a hand of a user and a second pivot coupling fixed relative to the grip portion; and at least one stabilizer arm extending between a first end coupled to the support body and a second end supporting a stabilizing weight thereon below the first pivot coupling on the support body;

the first and second pivot couplings being arranged to be coupled for pivotal movement relative to one another about a balance point between the first and second pivot couplings such that the stabilizing weight of said at least one stabilizer arm supported below the balance point is balanced about the balance point with the handheld camera device arranged to be supported by the camera mount above the balance point; and said at least one stabilizer arm being arranged to support the support body such that the support body is self-supported in an upright orientation by said at least one stabilizer arm when said at least one stabilizer arm is engaged upon a horizontal supporting surface.

The configuration of the stabilizer arms of the balancing support system described herein also enables the dual function of: i) counterbalancing the camera when supported on the handle member, and ii) supporting the camera in an upright orientation when the stabilizer arms are simply engaged upon a supporting surface. The pivotal connection of the stabilizer arms to the support body also allows the orientation and height of the camera relative to the supporting surface to be readily adjusted without any additional operator support being required.

According to a further aspect of the present invention there is provided a balancing support system for a handheld camera device comprising:

a camera mount arranged to support the handheld camera device in fixed relation thereon;

a support body including a first pivot coupling and supporting the camera mount on a top side thereof such that the camera mount is arranged to support the handheld camera device above the first pivot coupling;

a handle member comprising a grip portion arranged to be gripped in a hand of a user and a second pivot coupling fixed relative to the grip portion; and at least one stabilizer arm extending between a first end coupled to the support body and a second end supporting a stabilizing weight thereon below the first pivot coupling on the support body;

the first and second pivot couplings being arranged to be coupled for pivotal movement relative to one another about a balance point between the first and second pivot couplings such that the stabilizing weight of said at least one stabilizer arm supported below the balance point is balanced about the balance point with the handheld camera device arranged to be supported by the camera mount above the balance point;

a steering member separate from the support body, the steering member including a grip portion arranged to be gripped in a hand of user;

a first magnetic coupling member on the support body and a second coupling member on the steering member;

the first and second magnetic coupling members being arranged to interact magnetically with one another such that a steering movement of the steering member relative to the handle member is arranged to controllably induce a steering movement of the support body relative to the handle member.

The present invention further provides a steering arm which allows the user to steer the movement of the camera relative to the handle member without requiring direct contact of the user with a portion of the support system which is in fixed contact of the camera. Specifically, a magnetic interaction between the support body of the balancing support system and the steering arm allows the operator to guide the movement of the camera in a controlled manner which isolates any vibration movements from being translated to the camera.

Two embodiments of the invention will now be described in conjunction with the accompanying drawings in which.

BRIEF DESCRIPTION OF THE DRAWINGS

In the drawings like characters of reference indicate corresponding parts in the different figures.

DETAILED DESCRIPTION

Referring to the accompanying figures there is illustrated a hand-held camera balancing support system generally indicated by reference numeral 10. The system 10 is particularly suited for supporting a hand-held electronic device 12 of the type which is enabled with a camera arranged to capture video. Examples of suitable electronic devices arranged to be supported on the system include point and shoot digital cameras, smart phones, and the like.

According to a first embodiment of the system shown in FIGS. 1 through 7, the system includes a conventional camera mount arranged for mating connection with the threaded socket found in most camera bodies. According to a second embodiment shown in FIGS. 8 through 11, the system 10 is suitable for supporting any electronic device enabled with a camera even when no mount is specifically provided in the body of the device 12, for example an iPhone™ as shown in the illustrated embodiment. Although various embodiments are described and illustrated herein, the common features of the various embodiments will first be described.

The support system 10 generally comprises a support body 14 which extends between a top end 16 and a bottom end 18. The body comprises a unitary molded body which supports a camera mount 20 at the top end thereof upon which the camera device 12 is arranged to be fixed. The bottom end 18 of the support body supports two stabilizer arms 22 in pivotal connection thereto for counterbalancing a camera supported on the camera mount about a central balance point of the system.

The camera mount comprises a horizontal pivot shaft 24 which extends through the top end of the support body 14 in a lateral direction. The camera mount is arranged to fix the camera device 12 in relation to the pivot shaft 24 such that the camera is angularly adjustable with the pivot shaft about a first axis of the pivot shaft which extends horizontally in the lateral direction.

The body 14 further comprises a central bore extending vertically down from the top end to threadably receive a clamping screw 26 in alignment directly above the pivot shaft 24. Tightening the screw 26 thus urges the screw 26 downwardly into frictional contact with the pivot shaft 24 to frictionally retain the pivot shaft against rotation about the first axis at a selected orientation. The camera mount and camera supported thereon can thus be angularly adjusted about the first axis at any time while being frictionally retained at any set position relative to the support body.

The camera mount further comprises two side supports 30 fixed at opposing ends of the pivot shaft to extend upwardly therefrom. Fastener apertures located at the upper ends of the two side supports permit respective upper portions of the camera mounts to be mounted thereon. The upper portions of the camera mount vary between the two embodiments as described further below. In addition, the length of the pivot shaft can be varied between the two embodiments for supporting the two side supports 30 at different relative spaces therebetween in the lateral direction in the different embodiments.

The two stabilizer arms 22 each comprise an elongate arm portion 32 extending between a first end 34 pivotally coupled to the bottom end of the support body 14 and a second end which supports a stabilizer weight 36 thereon.

The first ends 34 are pivotally coupled onto opposing front and rear sides of the bottom end of the support body 14 such that each of the two stabilizer arms are pivotal and angularly adjustable relative to the support body about a common second axis 38 extending through the bottom end of the body. The second axis is also horizontal in orientation but instead extends in a longitudinal direction which is perpendicular to the lateral direction of the first axis of the camera mount.

The two stabilizer arms are supported for independent pivotal movement relative to the support body such that the angular position of the two stabilizer arms can be symmetrical or non-symmetrical about a vertical plane through the support body for supporting on horizontal or inclined surfaces as may be desired.

In a typical orientation, the two stabilizer arms extend downward and outward in opposing lateral directions towards the stabilizer weights at the bottom ends thereof which are spaced apart in the lateral direction on opposing sides of the support body locating the camera mount and camera device thereon.

Each stabilizer weight is elongate and cylindrical in shape and is mounted through respective apertures in the bottom ends of the respective stabilizer arms. The weights are elongate in the longitudinal direction of the second axis so as to be parallel to the axis of rotation of the stabilizer arms relative to the support body. A screw selectively fixes the position of the weights relative to the respective stabilizer arm. The two stabilizer weights are typically off-set in a longitudinal direction relative to the respective stabilizer arm towards the centre of the support body such that each of the two weights are generally centered in the longitudinal direction relative to the body and are effectively aligned with one another in the longitudinal direction.

Each of the stabilizer weights includes a contact ring 40 extending circumferentially about the weight at longitudinally spaced positions thereon in which the contact ring comprises a resilient member for gripping and non-marking engagement with a supporting surface such as a horizontal table for example. The rounded bottoms of the two stabilizer weights permit the stabilizer weights to function as footings which can be engaged upon a supporting surface at various angular orientations in relation thereto. Accordingly as the spacing between the weights is adjusted to vary the height of the support body relative to a supporting surface or as the inclination of the supporting surface varies from horizontal, the two footings defined by the stabilizer weights remain engaged upon the supporting surface in a stable configuration. The stabilizer arms are thus arranged to support the support body in an upright and self-supported orientation when the arms are engaged on a horizontal supporting surface.

Figure 1:
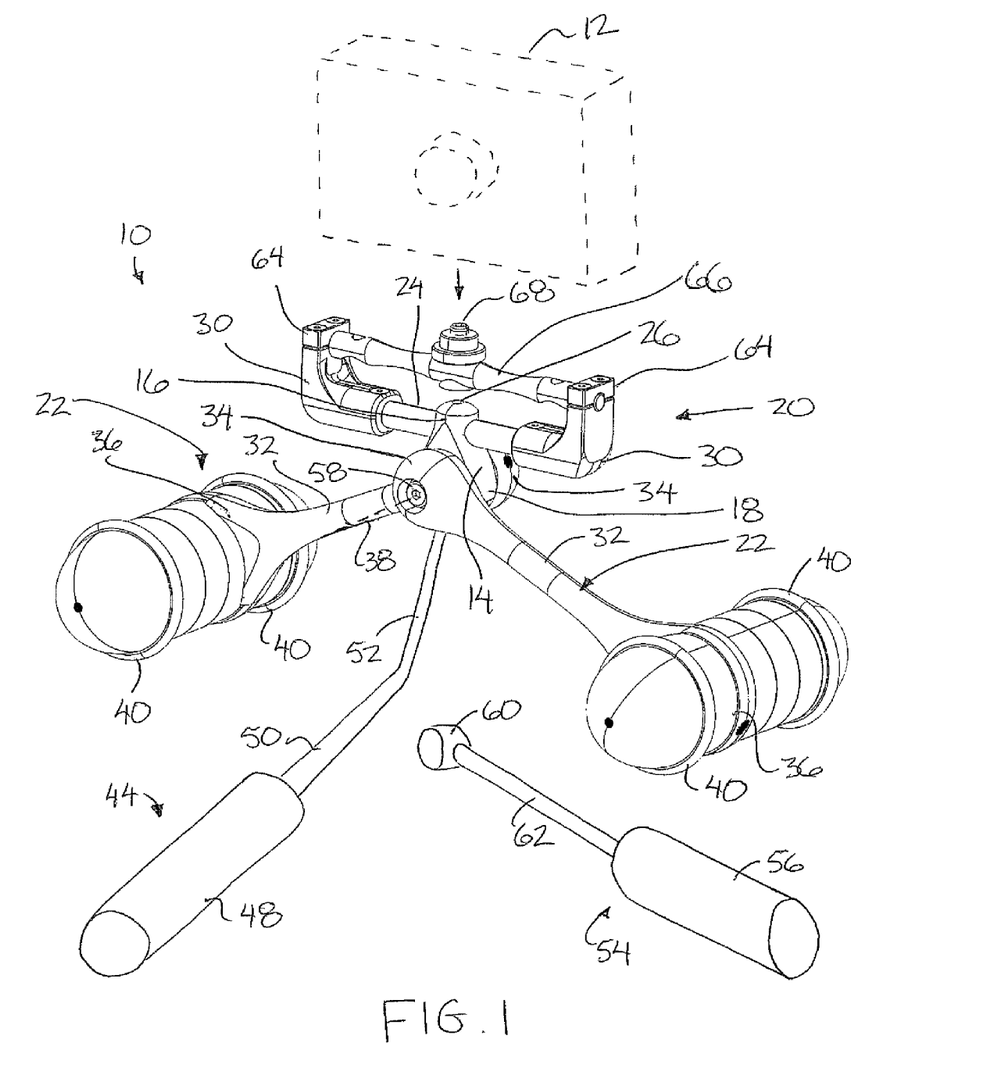
FIG. 1 is a perspective view of a first embodiment the balancing support system.
Figure 2:
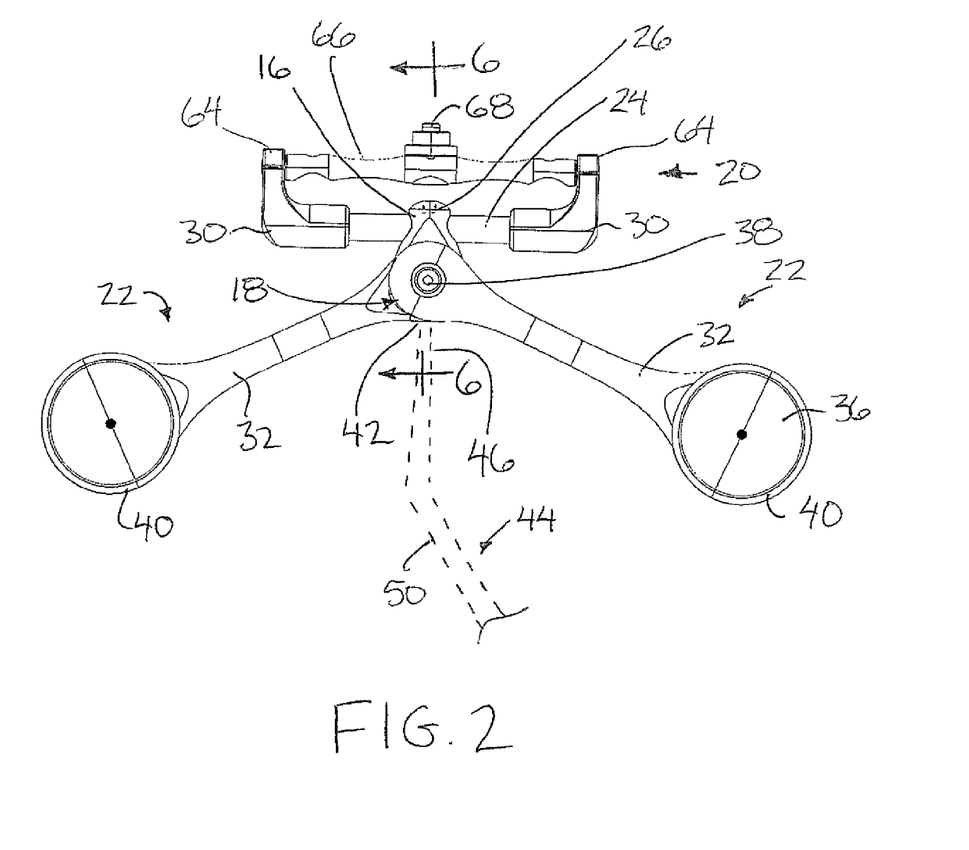
FIG. 2 is a front elevational view of the system according to FIG. 1.
Figure 3:
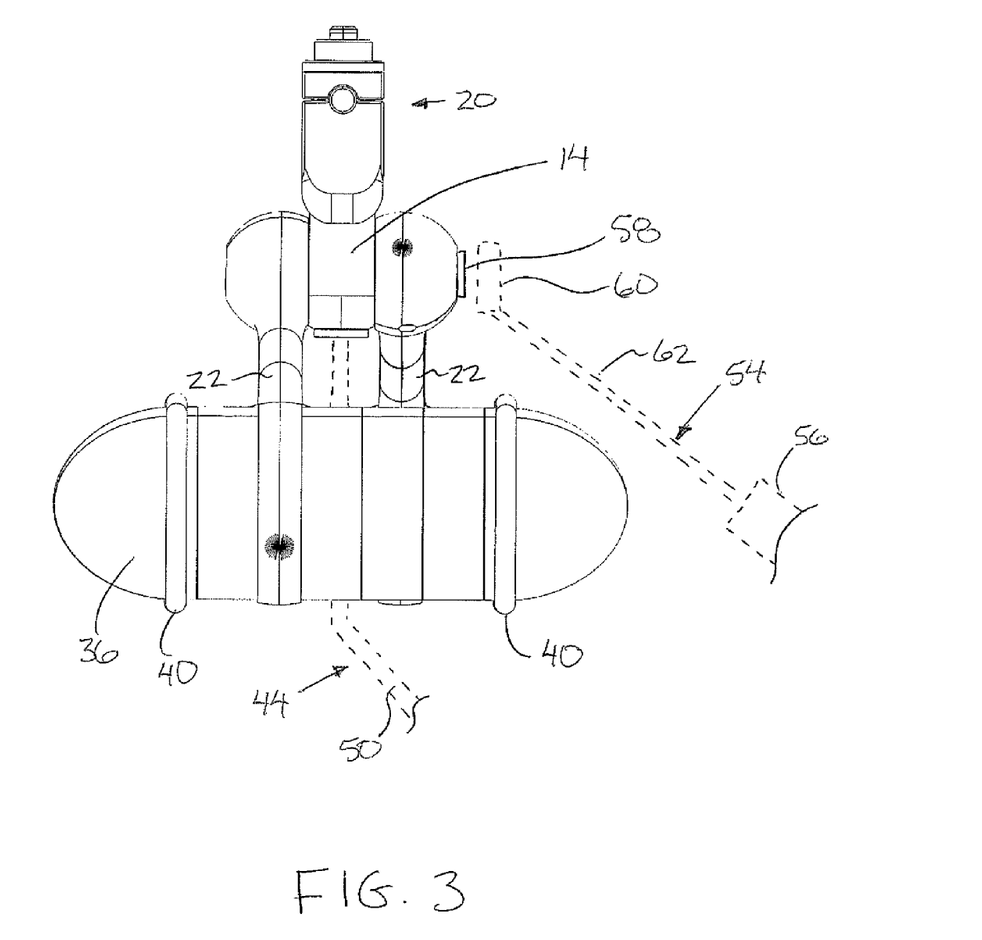
FIG. 3 is a side elevational view of the system according to FIG. 1.
Figure 4:
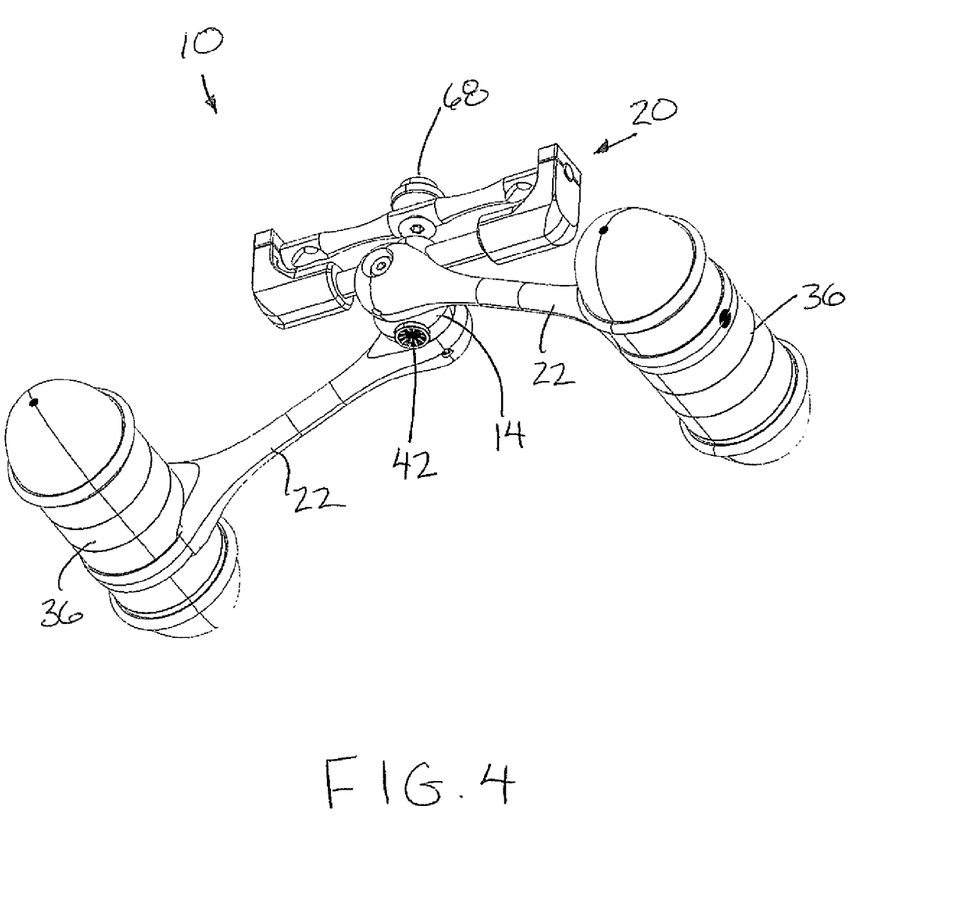
FIG. 4 is a perspective view of a bottom side of the system according to FIG. 1.
Figure 5:
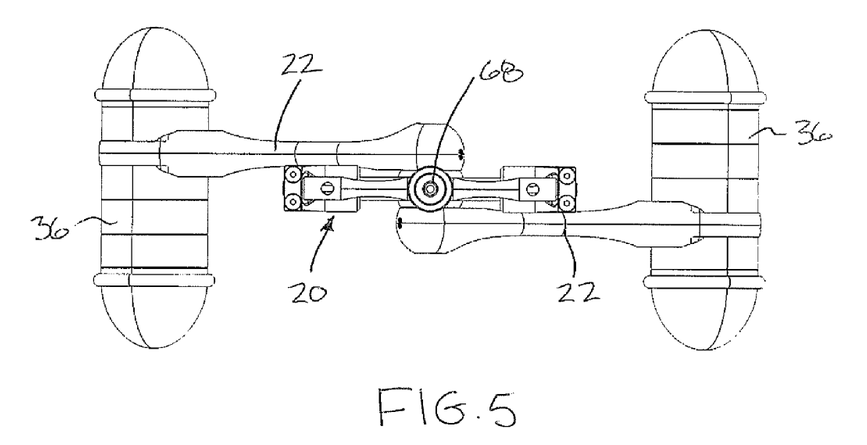
FIG. 5 is a top plan view of the system according to FIG. 1.
Figure 6:
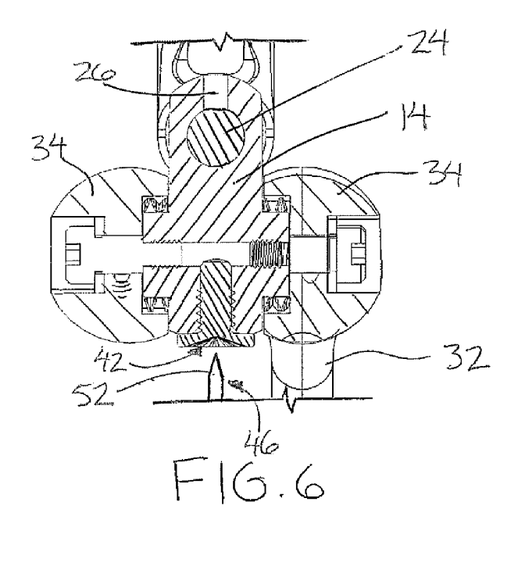
FIG. 6 is a sectional view along the line 6-6 of FIG. 3.
Figure 7:
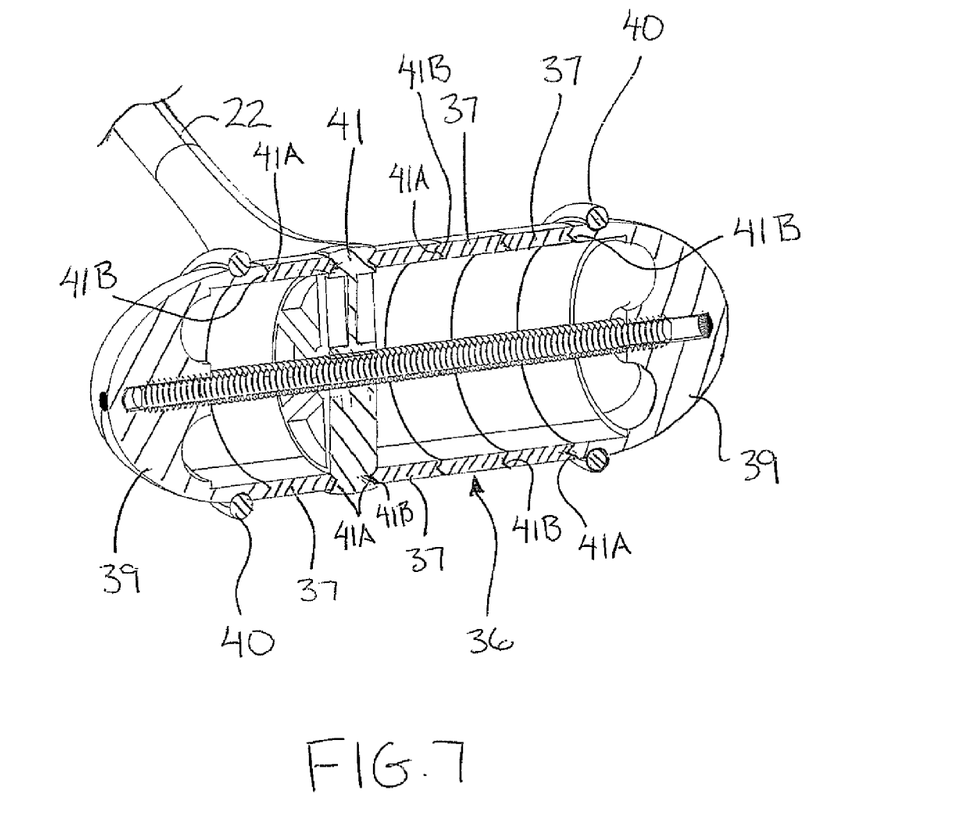
FIG. 7 is a sectional view along a vertical, longitudinal plane of one of the stabilizer weights.
Figure 8:
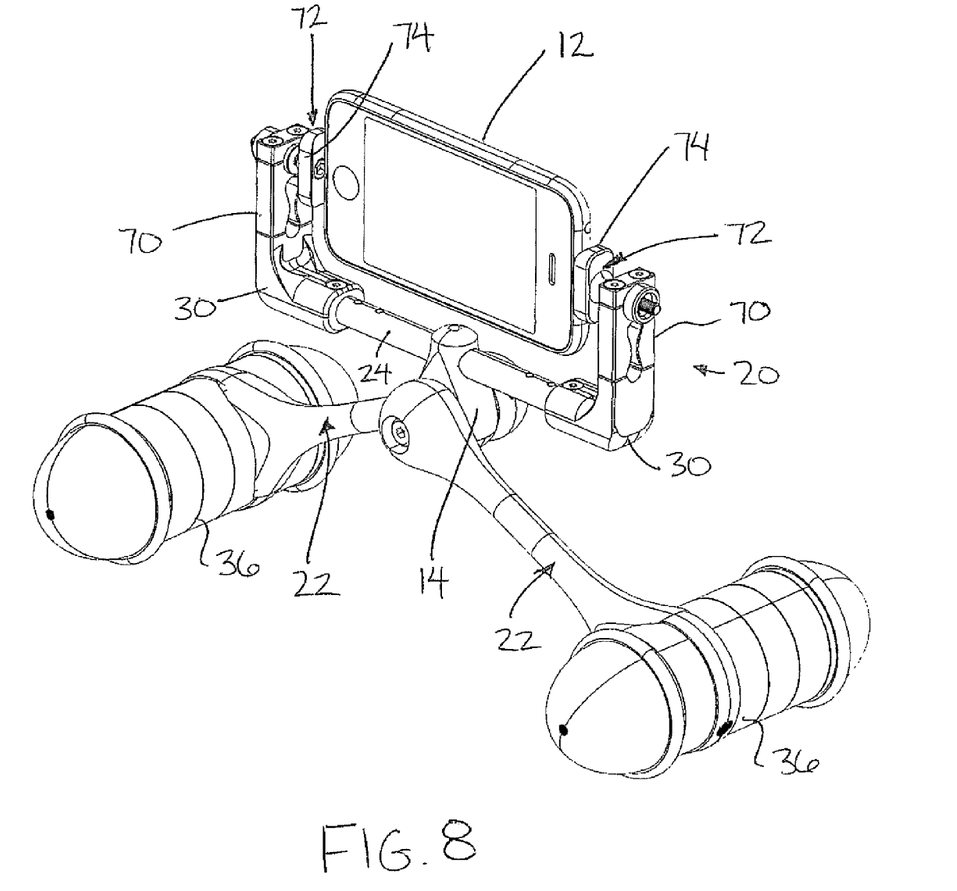
FIG. 8 is a perspective view of a second embodiment of the balancing support system.
Figure 9:
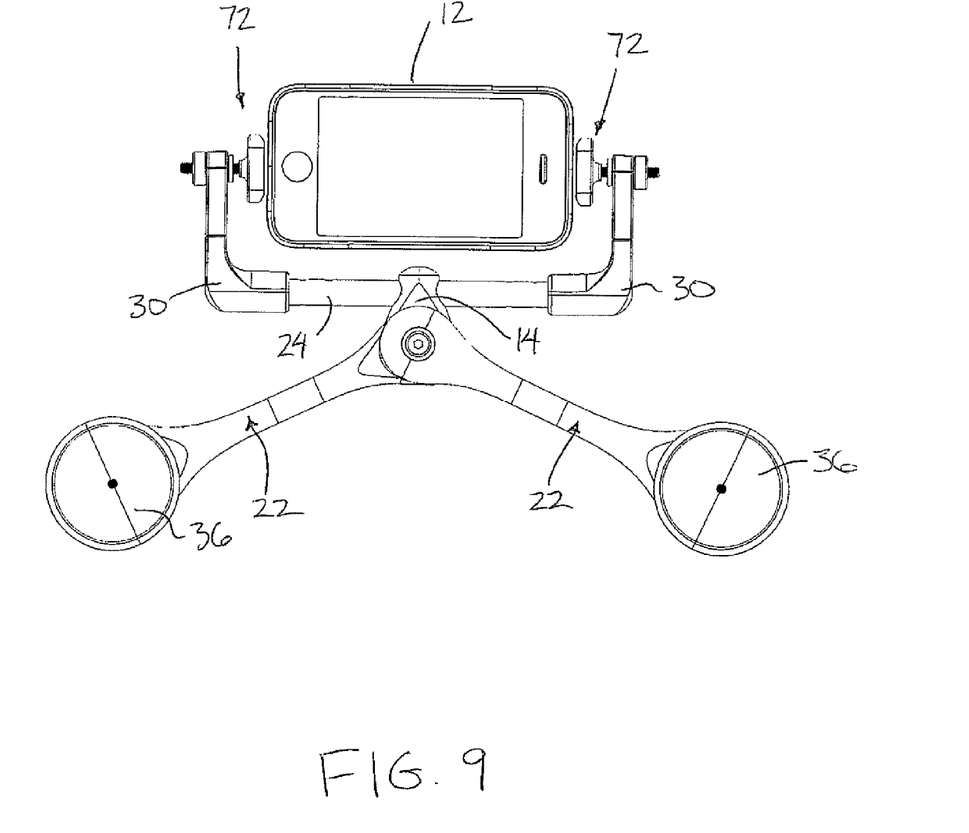
FIG. 9, FIG. 10 and FIG. 11 are respective front elevational, side elevational and top plan views of the system according to FIG. 8.
Figure 10:
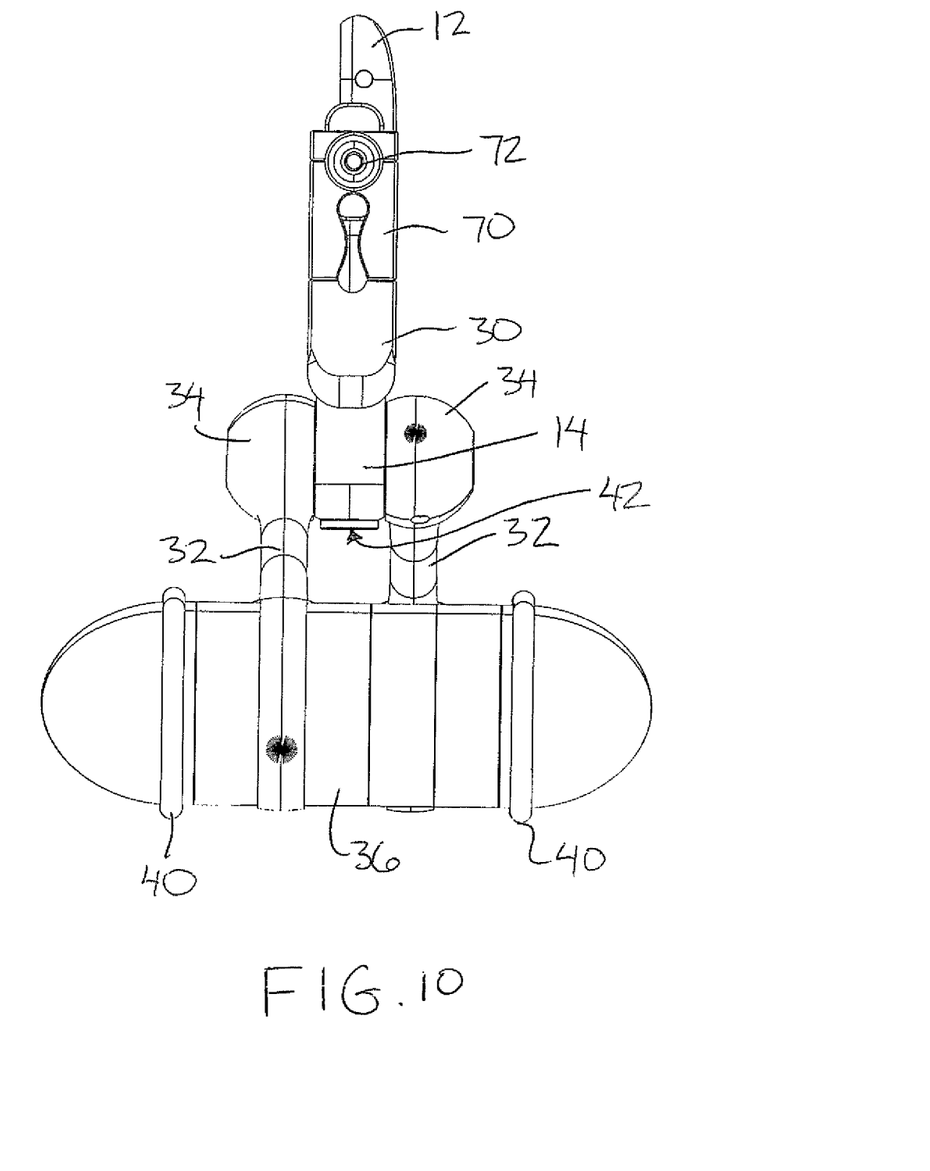
Figure 11:
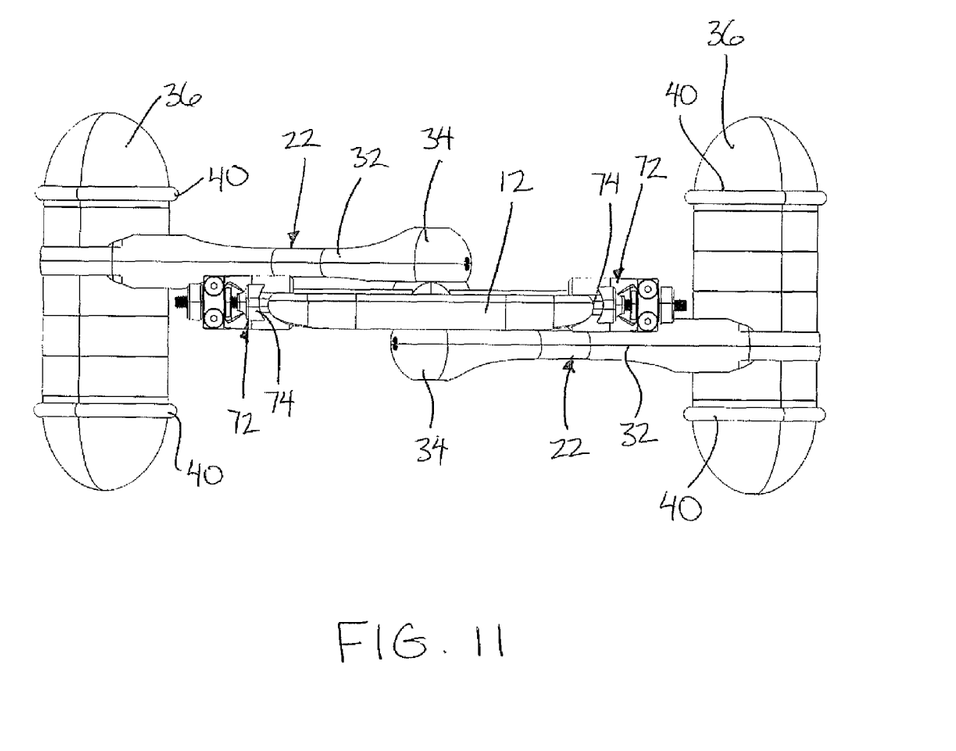

As shown more particularly in FIG. 7, the generally cylindrical body of each stabilizer weight 36 may be comprised of a plurality of separate intermediate modular sections 37 which are abutted with one another in the longitudinal direction between two opposing end modular sections 39 forming longitudinally opposed ends of the cylindrical body when assembled. The bottom end of each arm 22 in this instance includes a substantially cylindrical body portion 41 arranged to be abutted in series with the other sections modular sections. A central threaded rod 43 extends axially through the body portion 41 and all of the intermediate modular sections for threaded connected at opposing ends to the opposing ones of the end modular sections 39 so that the end modular sections effectively clamp the intermediate modular sections and the body portion 41 of the respective arm 22 therebetween in the assembly configuration.

The intermediate modular sections are annular members with a hollow passage therethrough to receive the threaded rod. First and second axially opposed ends of each intermediate modular section include a first mating face 41A and a second mating face 41B respectively for mating connection with the corresponding first or second mating face of an adjacent modular section abutted therewith.

The body portion 41 at the bottom of each arm similarly includes mating faces on opposing sides thereof for similar mating abutment between adjacent intermediate modular sections. Likewise, the end modular sections also include mating faces for similar mating abutment with respective outermost ones of the intermediate modular sections. When both ends of the body portion 41 comprise first mating faces 41A, both mating faces of the end sections can comprise second mating faces 41B to permit the intermediate modular sections to be clamped in series between the body portion 41 and either one of the opposing end modular sections.

The first and second mating faces 41A and 41B only mate when the modular sections and the body portion 41 are coaxial with one another and the threaded rod extending therethrough so as to maintain coaxial alignment when clamping the intermediate modular sections and the respective body portion 41 between the end modular sections 39.

By selecting a different length of threaded rod and a different number of intermediate modular sections clamped between the end modular sections, the overall weight and configuration of the stabilizer weight can be readily reconfigured and adjusted. The contact rings 40 remain supported on the end modular sections 39 regardless of the number of intermediate modular sections clamped therebetween.

A first pivot coupling 42 is supported at the bottom end of the support body so as to be centered in the longitudinal direction between the two stabilizer arms. The first pivot coupling comprises a socket which is threaded into the bottom end of the support body and which is open at a bottom end for mating connection with a suitable handle member 44.

The socket 42 includes an inner surface which tapers upwardly and inwardly to a central apex of the socket having an interior angle of approximately 135 degrees. The first pivot coupling 42 is centered in the lateral direction relative to the camera mount and stabilizer weights as well as being centered in the longitudinal direction in relation thereto. The first pivot coupling is also located at an intermediate location in the vertical direction between the camera supported on the camera mount on the top end of the body and the stabilizer weights on the ends of the stabilizer arms at the bottom end of the body.

The handle member 44 includes a second pivot coupling 46 which is arranged to engage in mating connection with the first pivot coupling to define the balance point of the balance system at the contact point between the first and second pivot couplings. The handle member 44 includes a grip portion 48 arranged to be gripped in a single hand of an operator. An arm portion 50 extends from the grip portion to a tip portion 52 opposite the grip portion. The arm portion is an elongate rod comprising first and second portions which are substantially straight and which are bent relative to one another at an obtuse angle between 90 and 180 degrees. An overall length of the rod forming the arm portion is arranged to be longer than each of the stabilizer arms such that the grip portion of the handle member is arranged to be supported below in elevation relative to the stabilizer weights at the bottom ends of the stabilizer arms.

The tip portion 52 of the handle member comprises a free end of the elongate rod forming the arm portion which become narrower upwardly and inwardly to a central apex at the free end which is aligned with and in contact with the central apex of the first pivot coupling in the balanced and supported position of the support body on the handle member. The balance point of the stabilizer body is thus defined at the central apex at the free end of the tip portion of the handle member.

The tip portion fits within the socket such that the socket diverges outwardly from the apex to the mouth of the socket by a greater degree than the diverging tip portion such that the tip portion is narrower at the mouth of the socket than the socket to define an annular space therebetween. The apex of the tip portion in the illustrated embodiment is near 45 degrees. The narrower dimensions of the tip portion within the socket allow free side-to-side and front-to-back rocking motion of the support body relative to the handle member to allow free deviation of the handle member from the vertical axis of the support body. In this manner, minor variations in inclination of the handle member supported in the hand of the operator are not transmitted to minor variations in inclination of the camera balanced on the support body.

In each instance the first and second pivot couplings are arranged to be coupled for pivotal movement relative to one another about the balance point between the pivot couplings. More particularly the tip portion is received in the socket such that the apex of the tip portion is aligned with the apex of the socket at the balance point and such that the stabilizing weight of the stabilizer arms are supported below the balance point in balance about the balance point with the hand-held camera device supported by the camera mount spaced above the balance point.

The camera mount typically supports the camera thereon such that the camera is directed to capture video in the longitudinal direction of the second axis. To vary the orientation of the camera about a vertical axis through the apex of the handle member 44, a steering member 54 is provided to effectively steer orientation of the camera. The steering member includes a grip portion 56 also arranged to be gripped in a single hand of the operator. A first magnetic coupling 58 on the support body is arranged to magnetically interact with a second magnetic coupling 60 supported by an arm portion 62 of the steering member such that the magnetic coupling 60 is supported at a free end of the steering member opposite the grip portion. The first magnetic coupling 58 on the bottom of the support body may comprise a pair of couplings at opposing sides of the support body. In the illustrated embodiment the first magnetic coupling is supported at one end of the second axis by a common fastener coupling the stabilizer arms to the bottom end of the support body.

One or both of the first and second magnetic couplings comprises a magnet. If only one comprises a magnet, the other comprises ferromagnetic material. Accordingly in either instance the first and second magnetic couplings are arranged to magnetically interact with one another either by magnetic attraction or magnetic repulsion such that a controlled movement of the steering member with the second magnetic coupling in proximity to the first magnetic coupling results in a corresponding steering movement of the camera about the vertical axis extending through the balance point.

Turning now to the embodiment of FIGS. 1 through 7, the camera mount in this instance comprises two end clamps 64 supported on the two side supports 30. Each of the end clamps 64 is arranged to mount a respective one of two opposing ends of a mounting bar 66 thereon. The mounting bar 66 is thus supported in a horizontal orientation extending the lateral direction parallel and spaced above the pivot shaft.

A mounting fastener 68 is centrally located on the mounting bar 66 in the form of a threaded post which extends vertically upward for mating with a conventional threaded socket mount found in the base of typical commercially available camera bodies. The mounting bar 66 is typically fixed in orientation relative to the end clamps and the pivot shaft, however some adjustment of the orientation of the bar 66 and corresponding fastener 68 fixed to the camera body can be angularly adjusted about an auxiliary axis of the mounting bar which is parallel and spaced above the pivot shaft. The orientation of the fastener 68 is primarily adjusted by the angular adjustment of the pivot shaft described above.

The fastener 68 arranges the camera mount of FIGS. 1 through 7 to be suitable for use with any camera device having a conventional threaded socket mount in the bottom side thereof. A collar which surrounds the fastener 68 includes an upper surface which is higher in elevation than the end clamps 64 so that the collar can be clamped tightly to the underside of a camera device body by the fastener 68 regardless of the lateral dimensions of the camera device body.

Turning now to FIGS. 8 through 11, the camera mount in this instance comprises two clamp supports 70 supported on the two side supports 30 respectively. Each clamp support includes a horizontal bore extending therethrough for receiving a threaded post of a respective clamping member 72 therethrough. The two clamping members extend inwardly towards one another from the respective supports 70 such that the clamping members 72 are spaced apart in the lateral direction for engagement with opposing ends of a camera device arranged to be clamped therebetween. Each of the horizontal threaded posts of the clamping members is adjustable in a horizontal orientation for adjusting the clamping force and space between the two clamping members 72. Each clamping member 72 includes an inner face of resilient material 74 for direct contact with opposing ends of the camera device being supported therebetween. Typically a longer pivot shaft is used in the embodiment of FIGS. 8 through 11 than the embodiment of FIGS. 1 through 7 such that camera devices which are elongate in a longitudinal direction can be supported in a horizontal orientation such that the longitudinal direction of the device extends in the lateral direction of the camera mount and first pivot axis thereof.

In either embodiment a camera device is supported on the camera mount in fixed orientation relative to the support body. The stabilizer arms are adjusted in orientation about the second axis at the bottom end of the support body and the camera mount is adjusted about the first axis at the top end of the support body until the camera is oriented in the desired manner relative to the support body and balance point. Once the apex of the socket is aligned with the apex on the handle member by joining the first and second pivot couplings, the camera above the support body and the stabilizer weights below the support body are effectively counterbalanced about the centrally located balance point. An operator fully supports the camera by grasping the handle member in one hand.

A smooth and controlled steering movement of the camera and support body relative to the handle member can be achieved using the magnetic interaction between the steering member and the support body while maintaining space therebetween such that there is no direct contact therebetween. The steering member however is merely optional for improving the control of the camera device. Steady and fluid movements of the camera can still be readily achieved by simply supporting the support body on the handle member of the support system 10.

When it is intended to use the stabilizer arms as a support for supporting the camera on a supporting surface such as a table, the handle member is freely and readily separated from the support body and the orientation of the stabilizer arms is selected to support the camera body in the desired orientation.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A balancing support system for a handheld camera device comprising:
   a camera mount arranged to support the handheld camera device in fixed relation thereon;
   a support body including a first pivot coupling at a bottom side of the support body, the support body supporting the camera mount on a top side thereof opposite the bottom side such that the camera mount is arranged to support the handheld camera device above the first pivot coupling;
   a handle member comprising a grip portion arranged to be gripped in a hand of a user, a second pivot coupling at a free end of the handle member opposite the grip portion, and an arm portion extending in fixed relation between the grip portion and the second pivot coupling; and
   at least one stabilizer arm extending between a first end coupled to the support body and a second end supporting a stabilizing weight thereon below the first pivot coupling on the support body;
   one of the first and second pivot couplings comprising a socket including an inner surface which tapers inwardly to a central apex of the socket and the other one of the first and second pivot couplings comprising a tip portion tapering inwardly towards a central apex;
   the first and second pivot couplings being arranged to be coupled for pivotal movement relative to one another about a balance point between the first and second pivot couplings;
   the tip portion being arranged to be received in the socket such that:
      a contact area between the support body and the handle member is limited to a single point defining the balance point;
      the central apex of the tip portion is aligned with the central apex of the socket at the balance point; and
      the stabilizing weight of said at least one stabilizer arm supported below the balance point is balanced about the balance point at the central apex of the tip portion with the handheld camera device arranged to be supported by the camera mount above the balance point.

2. The system according to claim 1 wherein the tip portion is freely separable from the socket.

3. The system according to claim 1 wherein the socket diverges from the central apex thereof greater than the tip portion such that the support body is angularly adjustable relative to the handle member from a vertical pivot axis between the support body and the handle member while the central apex of the tip portion remains engaged with the central apex of the socket.

4. The system according to claim 1 wherein a length of the arm portion of the handle member is greater than a length of said at least one stabilizer arm between the first and second ends thereof.

5. The system according to claim 1 wherein the camera mount is supported on the support body such that the camera mount is angularly adjustable relative to the support body about a first axis and the first end of said at least one stabilizer arm is supported on the support body such that said at least one stabilizer arm is angularly adjustable relative to the support body about a second axis.

6. The system according to claim 1 wherein said at least one stabilizer arm comprises a pair of stabilizer arms pivotally coupled onto opposing sides of the support body adjacent a bottom end of the support body so as to be arranged for pivotally movement about a generally common horizontal axis.

7. The system according to claim 1 wherein the camera mount is supported on the support body such that the camera mount is angularly adjustable relative to the support body about a horizontal axis.

8. The system according to claim 1 wherein the camera mount comprises a threaded fastener arranged to mate with a threaded socket in the handheld camera device.

9. The system according to claim 1 wherein the camera mount comprises a pair of laterally spaced apart clamping members arranged to clamp against opposing sides of a body of the handheld camera device supported therebetween.

10. The system according to claim 9 wherein each clamping member includes a resilient member arranged to engage the respective side of the body of the handheld camera device.

11. The system according to claim 9 wherein the clamping members of the camera mount are pivotal relative to the support body about a common horizontal axis spanning in a lateral direction between the clamping members.

12. The system according to claim 9 in combination with a handheld camera device which is elongate in a longitudinal direction and which includes a camera arranged to capture video images in which the camera is oriented perpendicularly to the longitudinal direction, the clamping members supporting the handheld camera device therebetween such that the longitudinal direction of the handheld camera device spans horizontally between the clamping members.

13. The system according to claim 9 in combination with a handheld camera device comprising a smart phone clamped between the clamping members.

14. The system according to claim 1 in combination with a steering member which is separate from the support body, wherein the steering member includes a grip portion arranged to be gripped by a hand of user and wherein there is provided a first magnetic coupling member on the support body and a second magnetic coupling member on the steering member, the first and second magnetic coupling members being arranged to interact magnetically with one another such that a steering movement of the steering member relative to the handle member is arranged to controllably induce a steering movement of the support body relative to the handle member.

15. A balancing support system for a handheld camera device comprising:
   a camera mount arranged to support the handheld camera device in fixed relation thereon;
   a support body including a first pivot coupling and supporting the camera mount on a top side thereof such that the camera mount is arranged to support the handheld camera device above the first pivot coupling;
   a handle member comprising a grip portion arranged to be gripped in a hand of a user and a second pivot coupling fixed relative to the grip portion; and
   two stabilizer arms, each stabilizer arm extending between a first end coupled to the support body and a second end supporting a respective stabilizing weight thereon below the first pivot coupling on the support body such that the stabilizer weights are spaced apart in a lateral direction at opposing sides of the support body;
   the first and second pivot couplings being arranged to be coupled for pivotal movement relative to one another about a balance point between the first and second pivot couplings such that the stabilizing weights of the stabilizer arms supported below the balance point are balanced about the balance point with the handheld camera device arranged to be supported by the camera mount above the balance point; and the stabilizer weights and the stabilizer arms being arranged to support the support body such that the support body is self-supported in an upright orientation on the stabilizer arms when only the stabilizer weights are engaged upon a horizontal supporting surface.

16. The system according to claim 15 wherein the two stabilizer weights are spaced apart from one another in a lateral direction on opposing sides of the support body and the two stabilizer weights are elongate in a longitudinal direction oriented horizontally and perpendicularly to the lateral direction.

17. The system according to claim 16 wherein the stabilizer arms are independently angularly adjustable relative to the support body about a longitudinal axis oriented substantially parallel to the longitudinal direction of the stabilizer weights and wherein the stabilizer weights and the stabilizer arms are arranged to support the support body in an upright self-supported manner on the stabilizer arms throughout a range of angular positions when only the stabilizer weights are engaged upon a supporting surface.

18. The system according to claim 15 wherein the support body is adjustable in height relative to the stabilizer weights and wherein the stabilizer weights and the stabilizer arms are arranged to support the support body in an upright self-supported manner on the stabilizer arms throughout a range of heights relative to the stabilizer weights when only the stabilizer weights are engaged upon a supporting surface.

19. The system according to claim 15 wherein the two stabilizer weights are spaced apart from one another in a lateral direction at opposing sides of the support body and the two stabilizer weights are elongate in a longitudinal direction oriented perpendicularly to the lateral direction, the stabilizer weights each being substantially centered in the longitudinal direction relative to the support body.

20. A balancing support system for a handheld camera device comprising:

a camera mount arranged to support the handheld camera device in fixed relation thereon;

a support body including a first pivot coupling and supporting the camera mount on a top side thereof such that the camera mount is arranged to support the handheld camera device above the first pivot coupling;

a handle member comprising a grip portion arranged to be gripped in a hand of a user and a second pivot coupling fixed relative to the grip portion; and at least one stabilizer arm extending between a first end coupled to the support body and a second end supporting a stabilizing weight thereon below the first pivot coupling on the support body;

the first and second pivot couplings being arranged to be coupled for pivotal movement relative to one another about a balance point between the first and second pivot couplings such that the stabilizing weight of said at least one stabilizer arm supported below the balance point is balanced about the balance point with the handheld camera device arranged to be supported by the camera mount above the balance point;

a steering member separate from the support body, the steering member including a grip portion arranged to be gripped in a hand of user;

a first magnetic coupling member on the support body; and a second magnetic coupling member on the steering member;

the first and second magnetic coupling members being arranged to interact magnetically with one another while remaining spaced apart such that a non-contacting steering movement of the steering member relative to the handle member is arranged to controllably induce a steering movement of the support body relative to the handle member without contact between the first and second magnetic coupling members.

\* \* \* \* \*